United States Patent
Robotham et al.

(10) Patent No.: US 7,289,514 B2
(45) Date of Patent: Oct. 30, 2007

(54) SYSTEM AND METHOD FOR SCHEDULING DATA TRAFFIC FLOWS FOR A COMMUNICATION DEVICE

(75) Inventors: Robert E. Robotham, Ottawa (CA); Mustapha Aïssaoui, Kanata (CA)

(73) Assignee: Alcatel Canada Inc., Kanata (CA)

( * ) Notice: Subject to any disclaimer, the term of this patent is extended or adjusted under 35 U.S.C. 154(b) by 1040 days.

(21) Appl. No.: 10/304,770

(22) Filed: Nov. 27, 2002

(65) Prior Publication Data

US 2004/0100967 A1    May 27, 2004

(51) Int. Cl.
  *H04L 12/28* (2006.01)
  *G01R 31/08* (2006.01)
  *H04J 3/16* (2006.01)
  *G06F 15/173* (2006.01)

(52) U.S. Cl. .............. 370/395.4; 370/468; 370/395.43; 370/230.1; 709/229; 709/226

(58) Field of Classification Search ................ 370/468, 370/395.1, 395.4, 395.41, 395.43, 398, 400, 370/384, 391, 396, 358; 709/226, 229
See application file for complete search history.

(56) References Cited

U.S. PATENT DOCUMENTS

| | | |
|---|---|---|
| 5,926,459 A | 7/1999 | Lyles et al. |
| 6,046,981 A * | 4/2000 | Ramamurthy et al. ...... 370/232 |
| 6,198,723 B1 | 3/2001 | Parruck et al. |
| 6,560,230 B1 * | 5/2003 | Li et al. ................. 370/395.42 |
| 6,594,234 B1 * | 7/2003 | Chard et al. ................. 370/236 |
| 7,027,457 B1 * | 4/2006 | Chiussi et al. .............. 370/414 |
| 7,046,631 B1 * | 5/2006 | Giroux et al. .............. 370/234 |

* cited by examiner

*Primary Examiner*—Hanh Nguyen
(74) *Attorney, Agent, or Firm*—McCarthy Tetrault LLP

(57) ABSTRACT

The present invention provides a system and method for providing a different quality of service to a flow associated with an aggregate flow is provided. For an embodiment, the method comprises scheduling a plurality of data traffic flows in a communication network, the method comprising: (i) scheduling data traffic flows in a first category of data traffic, said first category of data traffic having a first bandwidth capacity associated therewith; (ii) determining whether any portion of said first bandwidth capacity is unused by data traffic flows in said first category of data traffic; and (iii) scheduling data traffic flows in a second category of data traffic providing said unused portion of said first bandwidth capacity for use for said data traffic in said second category.

16 Claims, 8 Drawing Sheets

SYSTEM AND METHOD FOR SCHEDULING DATA TRAFFIC FLOWS FOR A COMMUNICATION DEVICE

FIELD OF THE INVENTION

The invention relates generally to a system and method for scheduling data traffic flow for a communication device. In particular, the system and method relates to a traffic scheduling scheme which provides aggregation of data traffic flows and quality of service (QoS) guarantees for selected traffic flows.

BACKGROUND OF INVENTION

In systems performing data traffic management and switching of data in a communication network, it is frequently desirable to schedule elements of aggregates of data traffic flows. Aggregation of data traffic flows is provided in several data transmission protocols, including: ATM virtual paths (VPs) and MPLS label-switched paths (LSPs). Differing QoS requirements of the data traffic must be handled by the aggregated data traffic flows. One protocol which can handle different QoS requirements is a MPLS E-LSP. However for an aggregated data traffic flow, there may be a limit imposed on the bandwidth used by it. For example, such limits may be imposed on a bandwidth limited LSP carrying real-time (RT) and non-real-time (nRT) services.

Often, for data traffic carried over a communication network, a service level agreement (SLA) between a communication service provider and a customer will set levels-of-performance guarantees relating to the data traffic. Penalties are often imposed on the service provider when it fails to meet those guarantees. For example, the guarantee may specify a maximum acceptable delay for certain categories of data traffic flow, such as RT data traffic flow. Thus, a service provider must be mindful of meeting performance guarantees, while at the same time working with a limited amount of bandwidth available on the network.

Three general approaches for scheduling aggregated data traffic flows with different QoS requirements are known: (i) a QoS-centric approach; (ii) a flow-centric approach; and (iii) a hybrid of the first two approaches.

A "QoS-centric" approach schedules all flows (components of the aggregate and others) on a single scheduler. Aggregation is effectively not considered at the scheduling level. Rather, only identifiers are set so that subsequent devices will treat all of the flows as one flow. As an example of the "QoS-centric" approach, U.S. Pat. No. 5,926,459, issued to Lyles et al., discloses a per-flow queued data traffic shaper that serially emits packets of time-multiplexed flows in substantial compliance with individual network data traffic contracts for certain exclusive categories. The approach described in Lyles allows QoS requirements to be met, subject to the ability of the scheduler, without interference from an aggregation function. However, the QoS-centric approach cannot process the aggregation as a unit when scheduling the data traffic. As such, bandwidth limitations, bandwidth sharing and bandwidth guarantees for the aggregate cannot be provided.

A "flow-centric" approach uses a hierarchical scheduler in which all components of an aggregate (i.e. corresponding to a flow directed to a particular destination) are scheduled together on one scheduling entity. The scheduling entity is only used by components of that aggregate, and the scheduling entity is itself scheduled on a higher level entity. The flow-centric approach facilitates bandwidth limitations by limiting the service rate of the scheduling entity representing that aggregate. However, in this approach, the range of QoS levels that can be serviced is limited due to interference at the higher levels of scheduling. For example, scheduling of the aggregate may not permit the strict delay requirements of RT data traffic to be met without grossly over-provisioning the bandwidth. As another example, the servicing of an aggregate containing RT EF (expedited forwarding) data traffic may be delayed due to the servicing of other aggregates that at the time only contain, say, best effort data traffic.

A hybrid approach uses hierarchical scheduling to form sub-aggregate flows having similar QoS. An example of the third approach is U.S. Pat. No. 6,198,723, issued to Parruck et al., which discloses a method for shaping the output of cells on an output path of a data transmitting device. However, the hybrid approach shares the same limitations as the first approach and cannot process the aggregate data traffic as a single unit when scheduling the data traffic.

Accordingly, there is a need for a method and system which aggregates data traffic flows for scheduling purposes and handles data traffic flows having significantly different QoS requirements which can address shortcomings of the known scheduling approaches.

SUMMARY OF INVENTION

In a first aspect, a method of providing a different quality of service to a flow associated with an aggregate flow is provided. The method comprises:

(i) scheduling data traffic flows in a first category of data traffic, said first category of data traffic having a first bandwidth capacity associated therewith;

(ii) determining whether any portion of said first bandwidth capacity is unused by data traffic flows in said first category of data traffic; and (iii) scheduling data traffic flows in a second category of data traffic providing said unused portion of said first bandwidth capacity for use for said data traffic in said second category.

In an embodiment, the method further comprises:

(iv) associating said second category of data traffic with a second bandwidth capacity for scheduling data traffic flows in said second category of data traffic, said second bandwidth capacity providing bandwidth for said second category of data traffic in addition to any said unused portion of said first bandwidth capacity.

In a second aspect, a system for providing a different quality of service to a flow associated with an aggregate flow is provided. The system comprises:

at least one scheduler for scheduling data traffic flows in first and second categories of data traffic, said scheduler being configured to associate with said first category of data traffic a first bandwidth capacity; and associate with said second category of data traffic any unused portion of said first bandwidth capacity.

In an embodiment, said second category of data traffic is associated with a second bandwidth capacity, said second bandwidth capacity providing bandwidth for data traffic flows in said second category of data traffic in addition to any said unused portion of said first bandwidth capacity.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
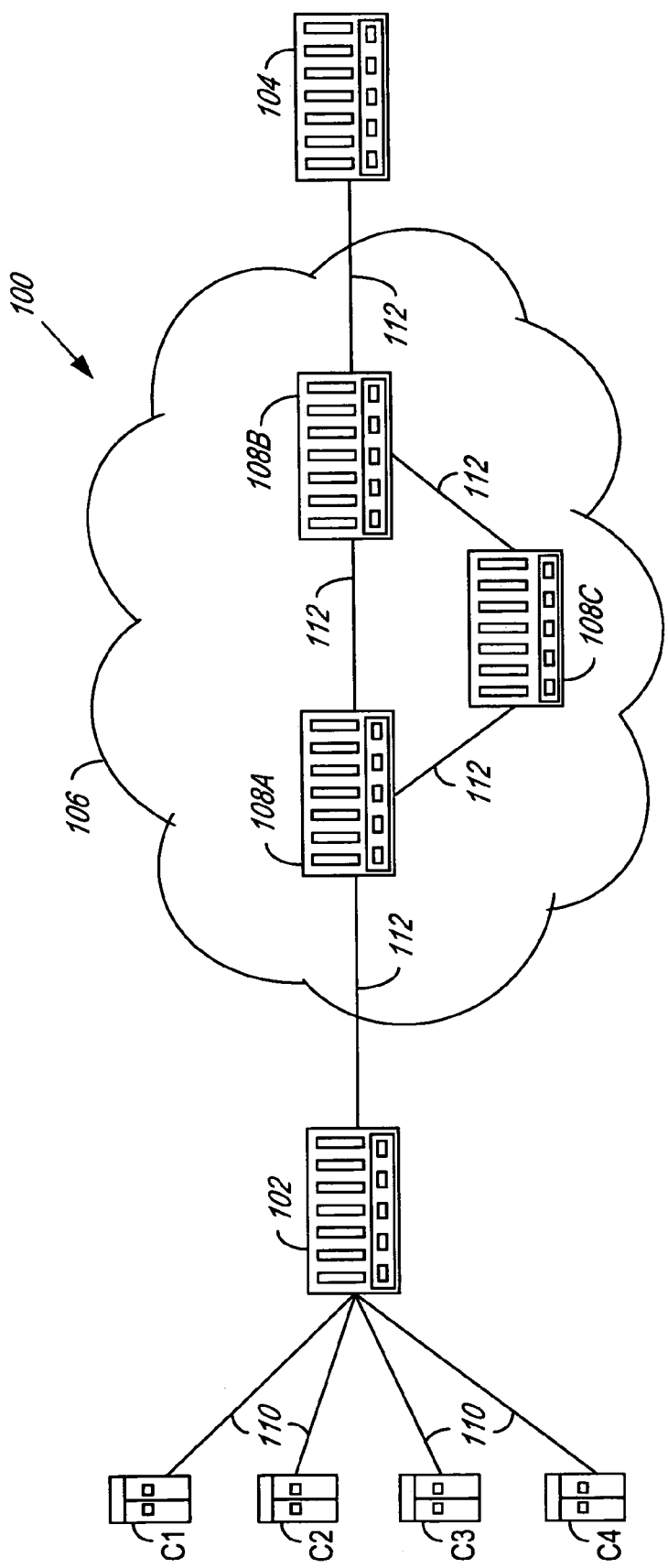
FIG. 1 is a block diagram of a network in which data traffic from a number of sources is directed to an access node for transmission through the network to a destination node.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Now referring to FIG. 1, shown is an exemplary network 100 in which a number of customers C1 . . . C4 are connected to access node 102 via network access links 110. In the present example, the access node 102 acts as a source node in the network 100 and is in turn connected to a network cloud 106 containing a plurality of switching nodes 108A, 108B, 108C. The switching nodes 108A, 108B, 108C form the backbone of network cloud 106 and are interconnected via network communication links 112. A destination node 104 is connected via a network communication link 112 on the other side of network cloud 106.

Source node 102 receives data traffic flow from customers C1 . . . C4 via network access links 110 and is enabled to route the customer data traffic flow towards any one of a number of destination nodes connected to the network 100. As noted earlier, it is often desirable to aggregate flows of data traffic directed to a particular destination so that any intermediary devices (for example, nodes 108A, 108B, 108C) may conveniently treat the aggregate as a single data traffic flow. Treating the aggregate as a single data traffic flow may facilitate, for example, use of a dedicated connection to that destination having a limited bandwidth to accommodate that aggregate data traffic flow.

In the present example, data traffic flow from customers C1 and C2 enters access node 102 and is directed to the destination node 104. For the purposes of this example, it is assumed that customers C1 and C2 each have data traffic flows with different QoS requirements. For example, the data traffic flows from each of customers C1 and C2 may include both RT data traffic and nRT data traffic. While there may be further differentiation in QoS levels within each category or class of data traffic, generally, the most significant QoS differences are often found between RT data traffic and nRT data traffic. More specifically, RT data traffic has strict delay constraints but the amount of bandwidth arriving is well controlled. Thus, a key performance criteria for RT data traffic is minimal delay. On the other hand, nRT data traffic does not have strict constraints on delay and the level of bandwidth arriving tends to not be controlled. Thus, a key performance criteria for an aggregate of nRT data traffic is fair and efficient allocation and use of limited bandwidth.

Figure 2:
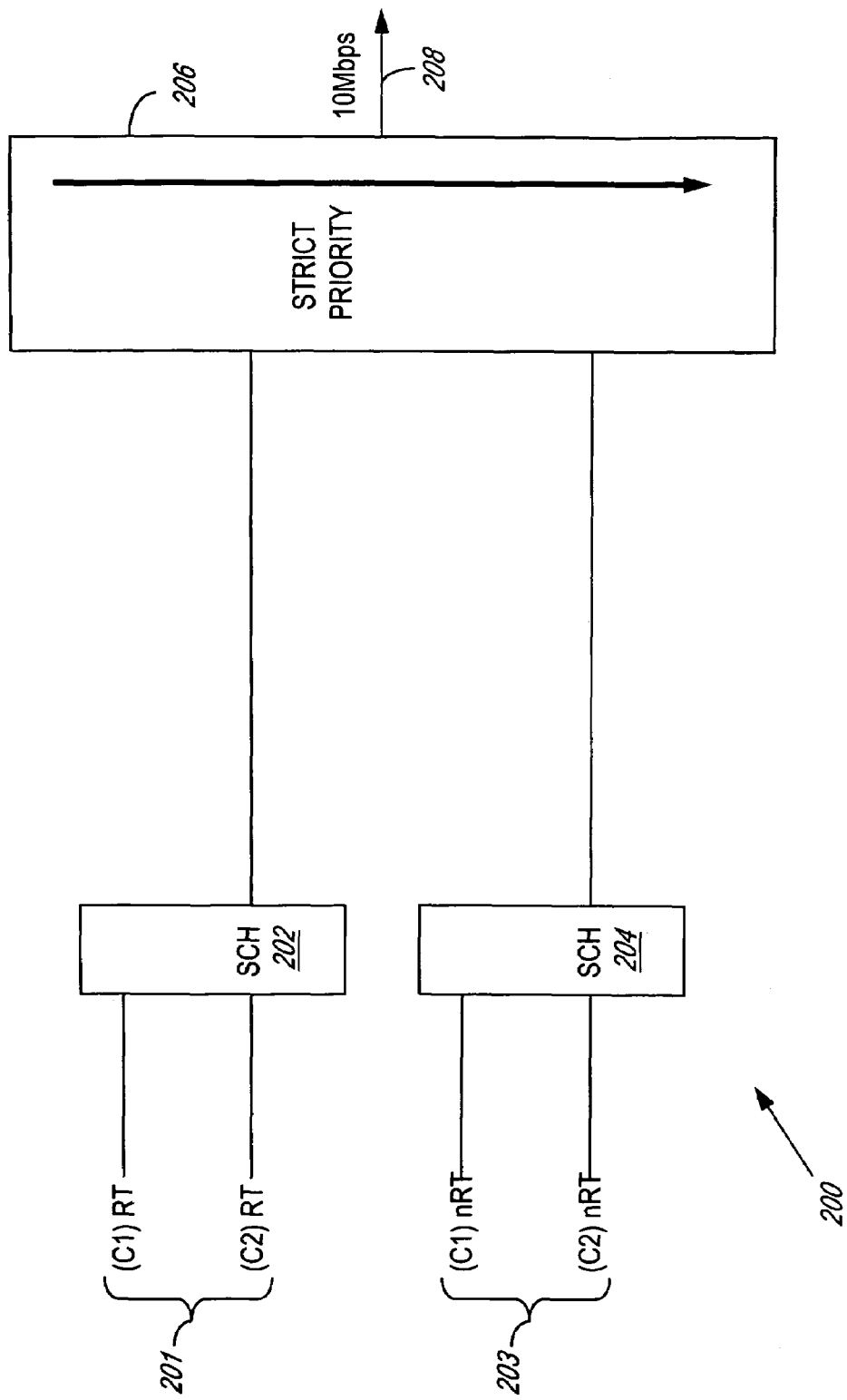
FIG. 2 is a block diagram of a prior art system and method for scheduling real-time (RT) data traffic and non-real-time (nRT) data traffic which may be utilized by the access node of FIG. 1.

Now referring to FIG. 2, shown by way of example is a prior art data traffic processing system 200 for handling data traffic flows with different QoS requirements (e.g. RT and nRT). This system 200 may be used by source node 102 for data traffic flows from customers C1 and C2. As shown, incoming RT data traffic flows 201 from customers C1 and C2 are scheduled by scheduler 202. The winning entry of scheduler 202 may then be scheduled by scheduler 206 for transmission on link 208. Meanwhile, nRT data traffic flows 203 from customers C1 and C2 are received and queued by scheduler 204. Scheduler 204 provides substantially the same function as scheduler 202, but is used to schedule nRT data traffic flows 203 instead. Again, the winning entry of scheduler 204 may then be scheduled by scheduler 206 for transmission on link 208.

Alternatively, as between scheduler 202 and scheduler 204, scheduler 206 may select, for example, scheduler 202 as the winning scheduler and scheduler 202 may then select a winning entry for transmission on link 208. As will be understood by those skilled in the art, the scheduler implementation shown may be chosen to provide a "fair" allocation of bandwidth between queues. However, fair allocation may not be guaranteed. It will also be appreciated that the queuing algorithms for schedulers 202 and 204 need not necessarily be the same algorithm.

Still referring to FIG. 2, as RT data traffic flows 201 and nRT data traffic flows 203 are both scheduled by scheduler 206, recently arrived RT data traffic 201 may not be serviced immediately if schedule 206 is currently processing nRT data traffic 203. Accordingly, a SLA with customers C1 and C2 providing for certain minimal delay requirements for RT data traffic may not be met by the service provider.

As will now be described, an embodiment of the invention processes data traffic flows having widely varying QoS requirements (such as between RT and nRT data traffic flows) and provides these requirements in a bandwidth-limited connection which is connected to a particular destination node. This is accomplished, generally, by enabling a scheduler handling lower priority data traffic to wait for access to bandwidth which is initially reserved for a higher priority scheduler, but subsequently not used by the higher priority scheduler.

Figure 3A:
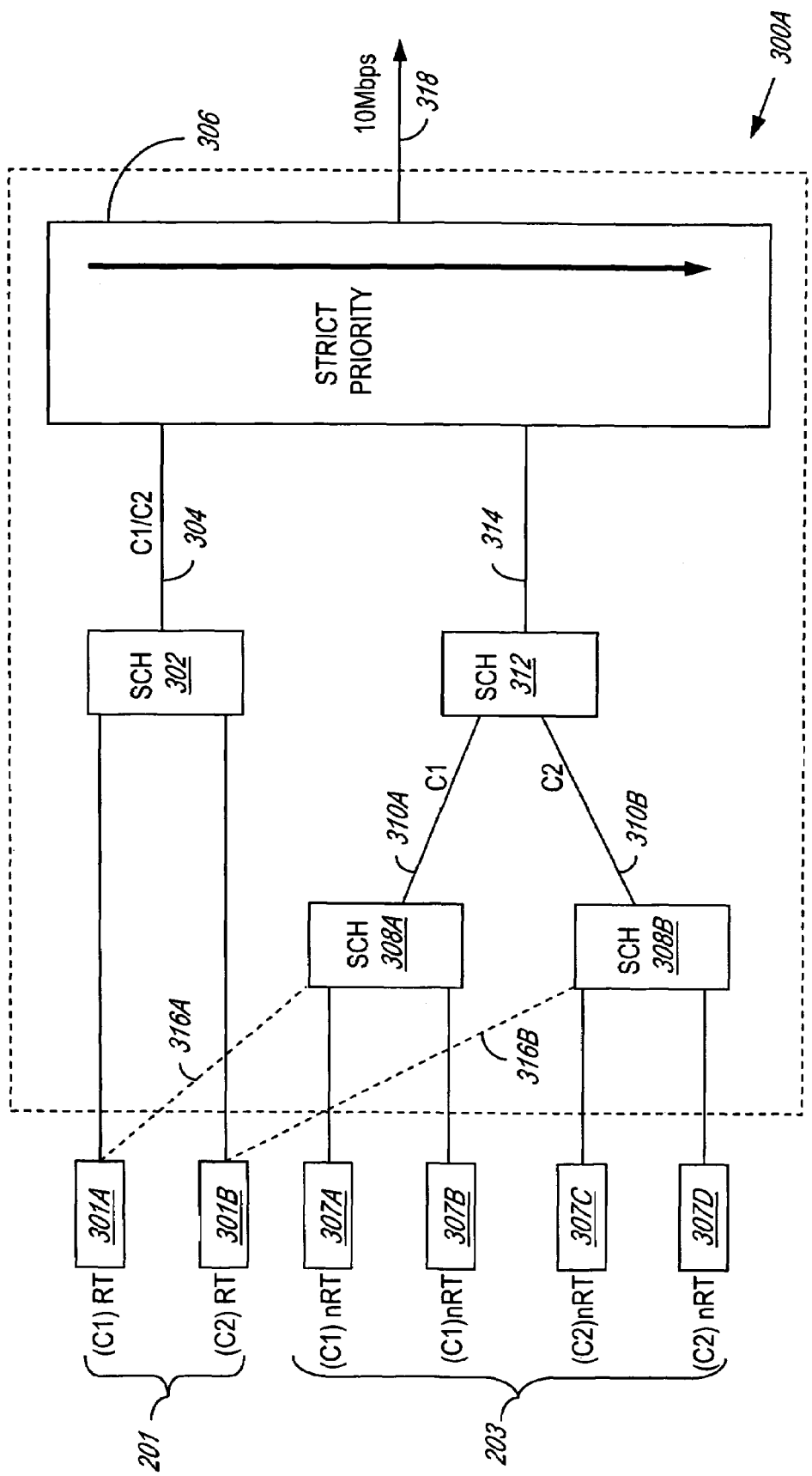
FIG. 3A is a block diagram of a scheduling arrangement of RT and nRT data traffic in accordance with an embodiment of the invention which may be used by the access node of FIG. 1.

Referring now to FIG. 3A, system 300A is an embodiment in which RT and nRT data traffic is received from customers C1 and C2 at an access node 102 (FIG. 1) and scheduled for transmission to the destination node 104 (FIG. 1) on a bandwidth-limited link 318. The embodiment utilizes certain features of the "flow-centric" approach as described above, but schedules the RT and nRT data traffic flows differently, as described below.

In the example shown, all incoming RT data traffic flows 201 from customers C1 and C2 are queued at incoming queues 301A and 301B, respectively, and serviced by scheduler 302. Therefore, in the present embodiment, all RT traffic for a given customer are aggregated into a single queue.

It will be appreciated that, in an alternative embodiment, RT data traffic flows from a given customer may be queued in separate queues for each flow, or differing levels of aggregation may take place. An alternative embodiment having multiple queues for the RT traffic of a given customer is described in further detail below.

Following conventions of known scheduling systems, RT data traffic 201 is scheduled in scheduler 302 and a winning entry is selected. The winning entry, shown as output 304, is forwarded to scheduler 306 for further processing and allocation of bandwidth to the associated connection on link 318. For the purposes of this example, the link 318 is rate-limited to 10 Mbps but this rate-limit is illustrative and not meant to be otherwise limiting. (As will be appreciated by those skilled in the art, while schedulers select what is to be serviced next, data does not actually flow through the scheduler. Rather, a scheduler will collect information on the data traffic, make a selection, and signal back to a queue manager to transmit the actual data.)

In the illustrative embodiment, scheduler 306 is a strict priority scheduler and RT data traffic flows 201 are accorded the highest priority therein. Accordingly, RT traffic flows 201 of customers C1 and C2 are processed before other traffic processed by scheduler 306, including any nRT data traffic flows 203 scheduled by schedulers 308A and 308B.

Alternatively, as between scheduler 302 and scheduler 312, priority scheduler 306 selects the winning scheduler 302 or 312 and causes the winning scheduler 302 or 312 to further select a winning entry.

Still referring to FIG. 3A, nRT data traffic flows 203 from customer C1 are queued in queues 307A and 307B and scheduled by scheduler 308A. Similarly, nRT data traffic flows 203 from customer C2 are queued in queues 307C and 307D and scheduled by scheduler 308B. In the illustrative embodiment, schedulers 308A and 308B are implemented as WFQs. The outputs of schedulers 308A and 308B, shown as outputs 310A and 310B respectively, are provided to scheduler 312, which may also be implemented as a WFQ. The scheduling of nRT data traffic flows 203 at scheduler 312 is similar to the scheduling that occurs in the "flow-centric" approach described earlier. However, the rate limiting of output 310A by scheduler 308A, for example, differs from the "flow-centric" approach in that both the amount of bandwidth used by RT traffic flows 201 for customer C1, and the amount of bandwidth used by the nRT traffic flows 203 for customer C1, are tracked.

In the illustrative embodiment, the tracking of the amount of bandwidth used by RT traffic flows 201 for customer C1 is accomplished by providing a link 316A between scheduler 308A and queue 301A. Through link 316A, bandwidth parameters relating to data traffic scheduled from queue 301A are communicated to scheduler 308A, thereby allowing scheduler 308A to track total bandwidth usage by customer C1 within system 300A. Scheduler 308A uses this information and the total bandwidth allotted to customer C1 to determine how much bandwidth, if any, is available for scheduling nRT data traffic flows 203 for customer C1. Accordingly, if RT traffic flow 201 for customer C1 has consumed all the available bandwidth, scheduler 308A knows that no bandwidth is available for the nRT data traffic flow 203 for customer C1. If RT traffic flow 201 for customer C1 has not consumed all of the bandwidth, then the nRT traffic flows 203 for customer C1 are given the unused bandwidth, allowing a combination of RT traffic flows 201 and nRT traffic flows 203 for customer C1 to be bandwidth limited as if the traffic flows 201, 203 were a single flow.

Similarly, a link 316B is provided between scheduler 308B and queue 301B for customer C2, and RT traffic flows 201 for customer C2 and nRT traffic flows for customer C2 can be combined and bandwidth limited like the traffic flows 201, 203 for customer C1.

It will be appreciated that limiting of bandwidth usage by aggregates of flows (i.e. aggregated by customer C1, C2, etc.) can be treated as a separate process from arbitrating bandwidth amongst the various schedulers 302, 306, 308A, 308B, 314 and queues 301A, 301B, 307A . . . 307D. In the present example, the bandwidth arbitration process is work conserving. That is, if any entity on the scheduler has data to send, then the scheduler will select from among the entities that contain data. For a rate limited entity, if the servicing of the entity would cause the rate to be violated, then the entity will not be considered for servicing. Therefore, for the unit performing arbitration, this is equivalent to the entity being empty. In this example, scheduler 306 will select scheduler 302 to determine the queue (301A or 301B) to be serviced next as long as scheduler 302 has any non-empty queues that have bandwidth available to be allocated. If all queues (301A and 301B) scheduled on scheduler 302 are either empty or have consumed all their allocated bandwidth, then scheduler 306 will select scheduler 312 to determine the scheduler (308A or 308B) that will determine the queue 307A . . . 307D to be serviced next. Accordingly, in this scheme, only schedulers having queues containing data traffic scheduled on them and having bandwidth available for transmission, will be considered for scheduling.

By way of example, using link 316A, communication between queue 301A and scheduler 308A may be implemented via a message generated when queue 301A is serviced by scheduler 302 and transmitted to the nRT scheduler 308A. The message would indicate the amount of bandwidth used by the RT queue 301A. The message may be implemented in a packet which is transmitted between the queue 301A and the scheduler 308A with a payload indicating the amount of bandwidth used. The RT queue 301A has a pointer to its associated scheduler 308A to indicate which scheduler the information is to be associated with. Alternatively, in local memory used by scheduler 308A, scheduler 308A may maintain a list of queues associated with it. Accordingly, as data traffic flows arrive at scheduler 308A, scheduler 308A can examine its list to identify which other queues are associated with it. Then scheduler 308A can send a message to the associated queues to see whether they have transmitted any data traffic and whether scheduler 308A can utilize any bandwidth not used by these other queues.

Figure 3B:
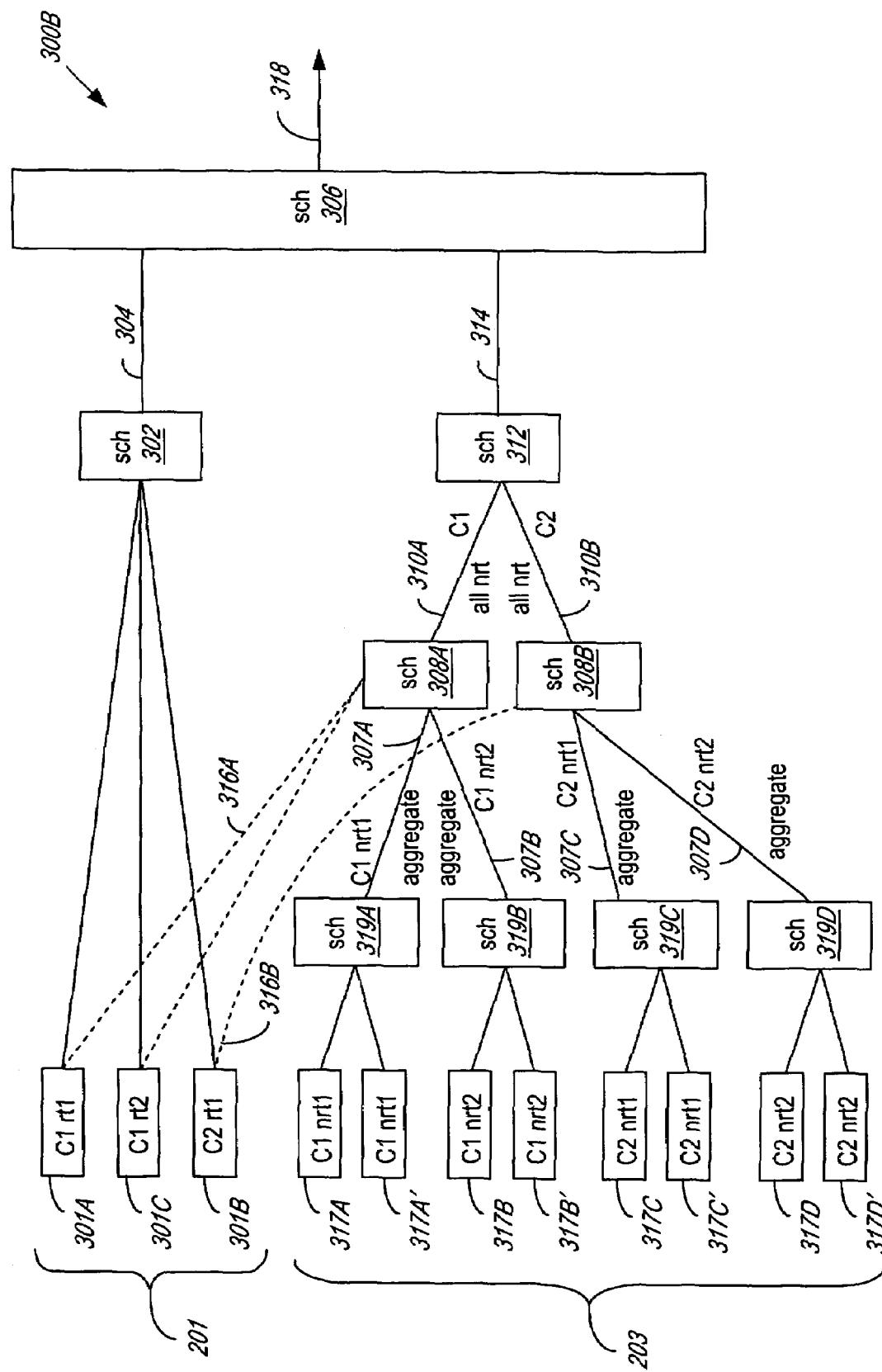
FIG. 3B is a block diagram of the scheduling arrangement of FIG. 3A having an additional level of schedulers.

It will be appreciated that the scheduling system 300A in FIG. 3A can have additional levels of schedulers to accommodate multiple RT classes and multiple nRT classes per customer. For example, as shown in FIG. 3B, system 300B contains scheduler 319A which schedules queues 317A and 317A', and scheduler 319B which schedules queues 317B and 317B'. Each scheduler 319A, 319B schedules a different nRT class for customer C1. Analogously, schedulers 319C and 319D schedule multiple nRT classes from queues 317C, 317C' and 317D, 317D' respectively. FIG. 3B also shows another RT class for customer C1 on queue 301C which is handled by scheduler 302. It will be appreciated by those skilled in the art that additional levels of schedulers and queues may be added to accommodate the required number of CoS classes for a particular application.

Figure 4A:
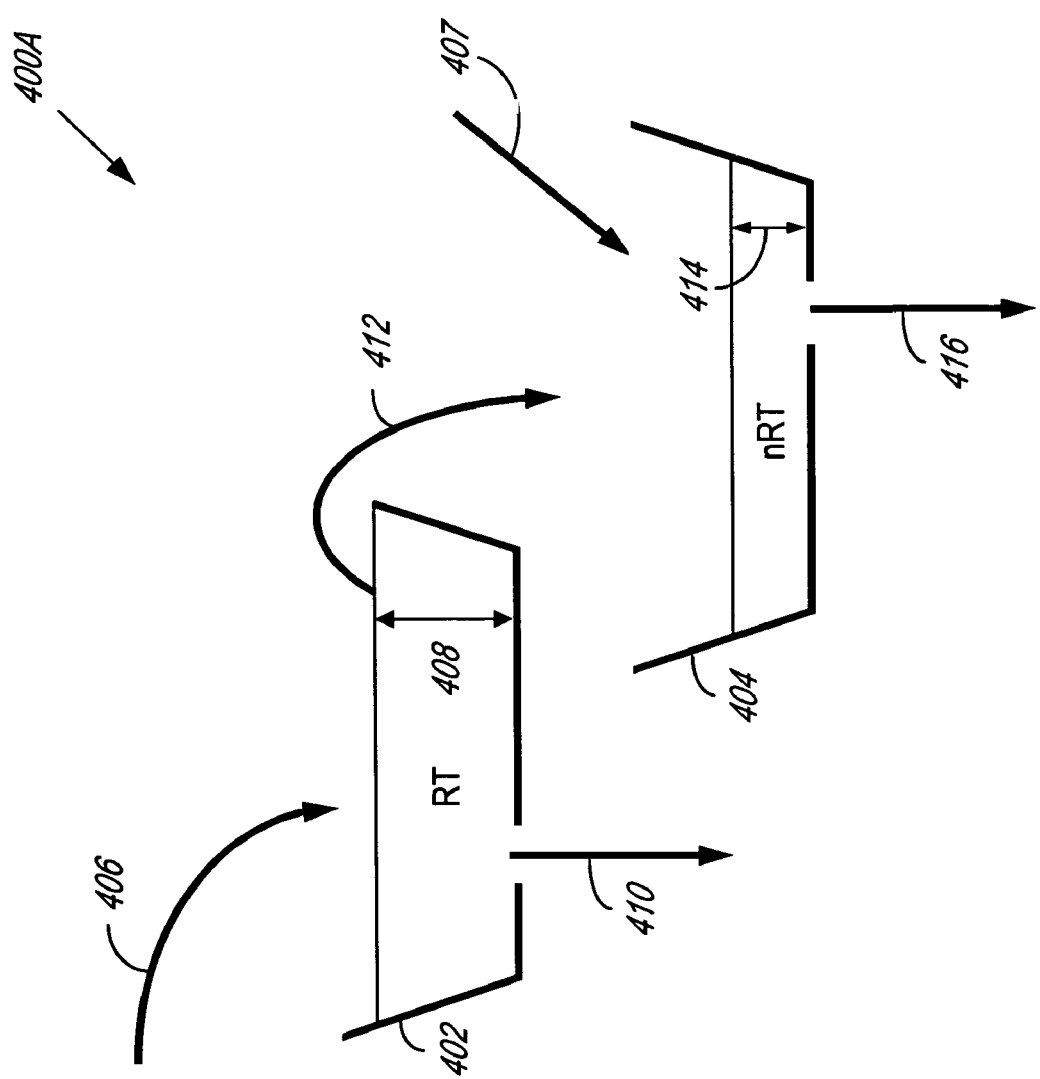
FIG. 4A is a schematic diagram of a token system exemplifying the scheduling arrangement of FIG. 3.

Now referring to FIG. 4A, an exemplary co-ordination of scheduling activity is shown via an analogy using tokens and buckets. Therein, in token system 400A, each token represents a unit of data transmittable by a particular queue or scheduler. The queues or schedulers are represented by the buckets, and tokens are collected into the buckets. The depth of tokens in any bucket represents the amount of data allowable for transmission by a queue or scheduler at a particular time. In the case of a scheduler, a token represents the amount of data that can be sent by any of the queues that are scheduled on that scheduler. The size of the bucket is the maximum burst tolerance rate of the scheduler. The rate 406 at which tokens arrive in the bucket 308 is the bandwidth (units of data per unit of time) available to the queue or scheduler associated with that bucket. As a scheduler processes a data traffic request, it removes the corresponding number of tokens allocated for the request from the scheduler's/queue's or subordinate scheduler's/queue's bucket. When a bucket overflows, there is excess bandwidth available for the rate-limited queue. The excess bandwidth may be directed to other buckets for their use.

By way of example, RT queue 301A is assigned bucket 402 and nRT scheduler 308A is assigned bucket 404. Buckets 402 and 404 are arranged such that a token input stream 406 flows into bucket 402. As bucket 402 fills with tokens, the level of tokens is indicated by depth 408. When scheduler 302 (FIG. 3) selects a RT traffic stream 201 for processing, tokens representing the amount of bandwidth allocated are removed from bucket 402. This is represented by output stream 410. If the output stream 410 is smaller than the input stream 406 because the bandwidth required by the queue 301A is less than the maximum allowed, depth 408 increases. If this condition persists, eventually, depth 408 reaches the rim of bucket 402. With any additional bandwidth provided by input stream 406, bucket 402 overflows and an excess stream of tokens 412 is generated, which flows into bucket 404. Information relating to excess stream 412 may be provided between the RT queue 301A and the nRT scheduler 308A via messages through link 316A, as described above.

As tokens from excess stream 412 collect in bucket 404, the depth of tokens rises therein, represented by depth 414. As nRT traffic for the scheduler 312 (FIG. 3A) is serviced, the bandwidth allocated to the serviced nRT traffic is removed from bucket 404. This is represented by output stream 416. Accordingly, it will be seen from the example that system 400A provides the scheduler associated with bucket 402 (i.e. scheduler 302) with guaranteed bandwidth from the total bandwidth of the system. Only when the requirements of traffic stream 201 have been fully met, is any excess bandwidth then provided to bucket 404.

It will be appreciated that the size of bucket 402 and the input stream 406 into bucket 402 should be sufficiently large to ensure that arriving RT data traffic flows do not fully deplete bucket 402 of tokens. At the same time, the size of bucket 402 should be small enough to allow some overflow of tokens to the second token bucket to process nRT data traffic 206. Thus, the capacity of the first token bucket 402 is determined by the burst rate of RT data traffic flows that must be handled by scheduler 302, as noted above, and the requirement for some minimal additional bandwidth for nRT data traffic.

In an alternative embodiment, a separate input stream of credits 407 may be provided to bucket 404 so that the total bandwidth available to customer C1 is always greater than the bandwidth permitted for the RT traffic of customer C1. In other words, some bandwidth will be allocated to nRT traffic for customer C1 regardless of the level of RT traffic for customer C1. In this alternative embodiment, the arrival rate of the RT data traffic must be more tightly constrained than the bandwidth permitted to all of the data traffic flows (including the aggregate of nRT data traffic flows and any associated RT data traffic flows). This means that each RT data traffic flow has its own defined bandwidth limitations on its rate and burst sizes, which is cumulative to any bandwidth limitation placed on the aggregate of nRT data traffic flows scheduled by scheduler 312.

Figure 4B:
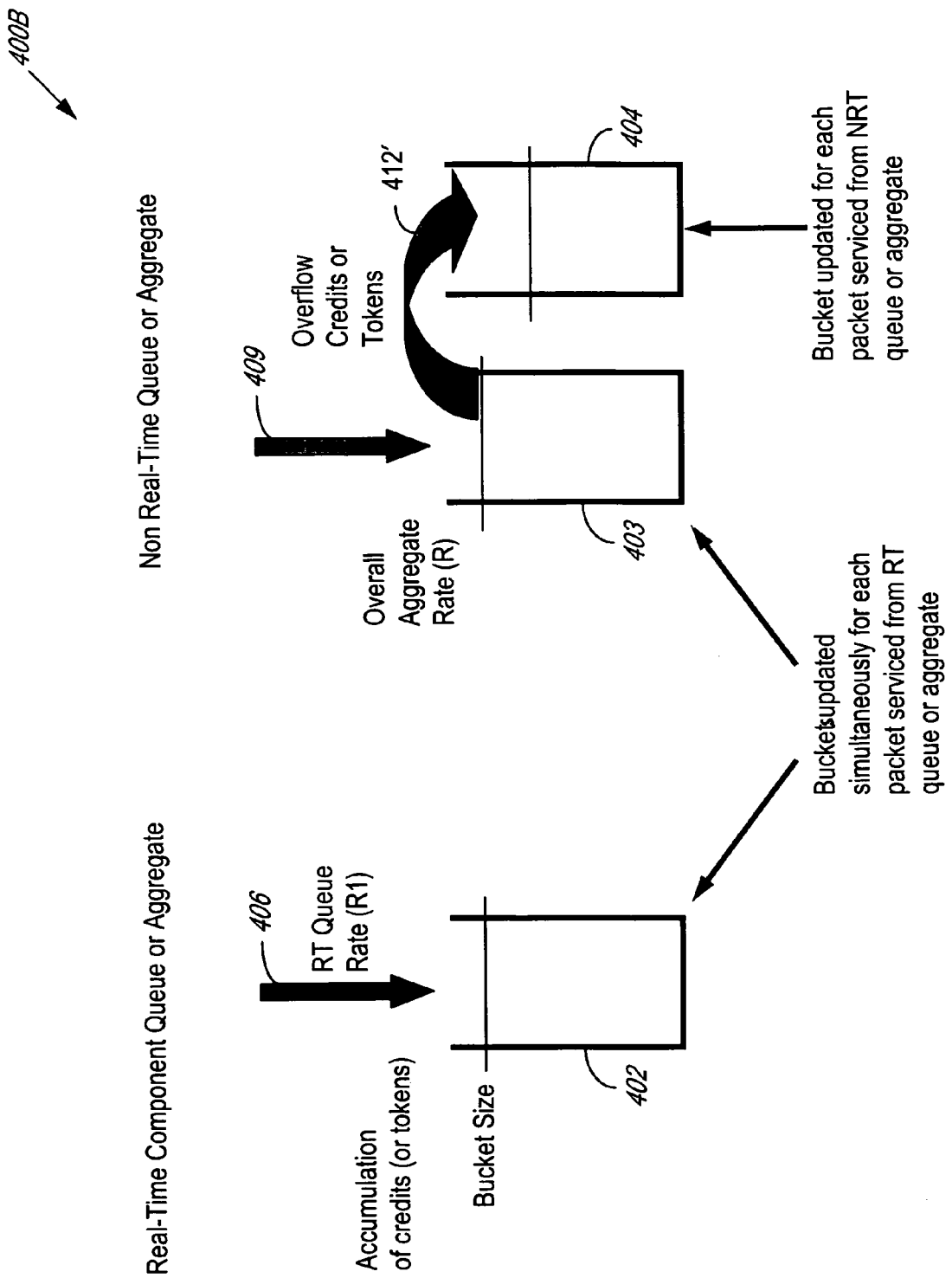
FIG. 4B is a schematic diagram of an alternative embodiment of the token system of FIG. 4A.

Now referring to FIG. 4B, in yet another alternative embodiment, system 400B is shown having a bucket 402 modelled as described above with reference to FIG. 4A and associated with queue 301A. However, system 400B also provides an aggregate bucket 403 which is associated with nRT scheduler 308A. Credits are removed from bucket 403 in the same manner as from bucket 402. Any overflow of credits from bucket 403 will then flow into bucket 404 associated with nRT scheduler 308A. In this alternative embodiment, the input stream 409 of credits to the aggregate bucket 403 can be made larger than the input stream 406 of credits to bucket 402. This will provide an overflow 412 of credits to bucket 404 which will guarantee that some amount of bandwidth will always be available to the nRT traffic.

Figure 4C:
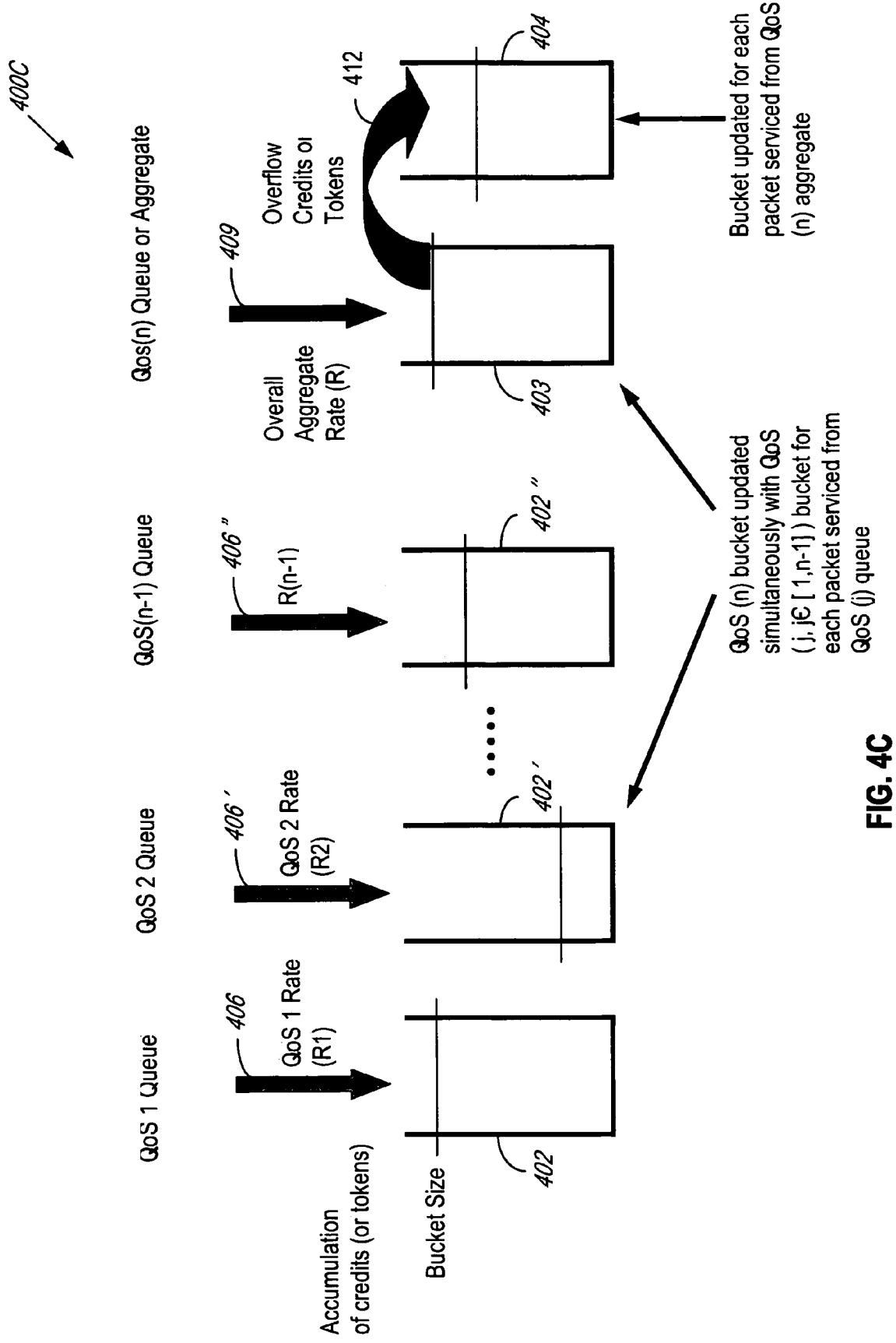
FIG. 4C is a schematic diagram of a generalized version of the token system of FIG. 4B.

It will be appreciated that the token system 400B of FIG. 4B may be generalized as shown by system 400C in FIG. 4C. System 400C includes multiple queues or schedulers represented by multiple buckets 402, 402', 402" etc. Each of these buckets 402, 402', 402" may represent, for example, a queue for data traffic having different QoS levels and rates R1, R2, . . . R(n-1). An aggregate bucket 403 having an aggregate rate R is again provided. The aggregate rate R is preferably greater than the aggregate of all of the individual rates R1, R2, . . . R(n-1) and the aggregate bucket 403 is updated at the same rate as the aggregate of all of the individual rates R1, R2, . . . R(n-1) of the multiple buckets 402, 402', 402". With a sufficient aggregate rate R, an overflow 412 of credits to bucket 404 guarantees at least some bandwidth for data traffic processed by bucket 404.

Advantageously, the solution described above in accordance with various illustrative embodiments allows components of an aggregate (i.e. the RT component in the present example) to be serviced with a higher QoS (e.g. lower delay) than is possible if the RT component was scheduled as part of an aggregate of flows, while at the same time assuring that the aggregate as a whole (i.e. the sub-aggregate of nRT data traffic flows and the associated RT data traffic flow) conforms to some defined bandwidth limitations (e.g. as set by an SLA for a customer C1).

Figure 5:
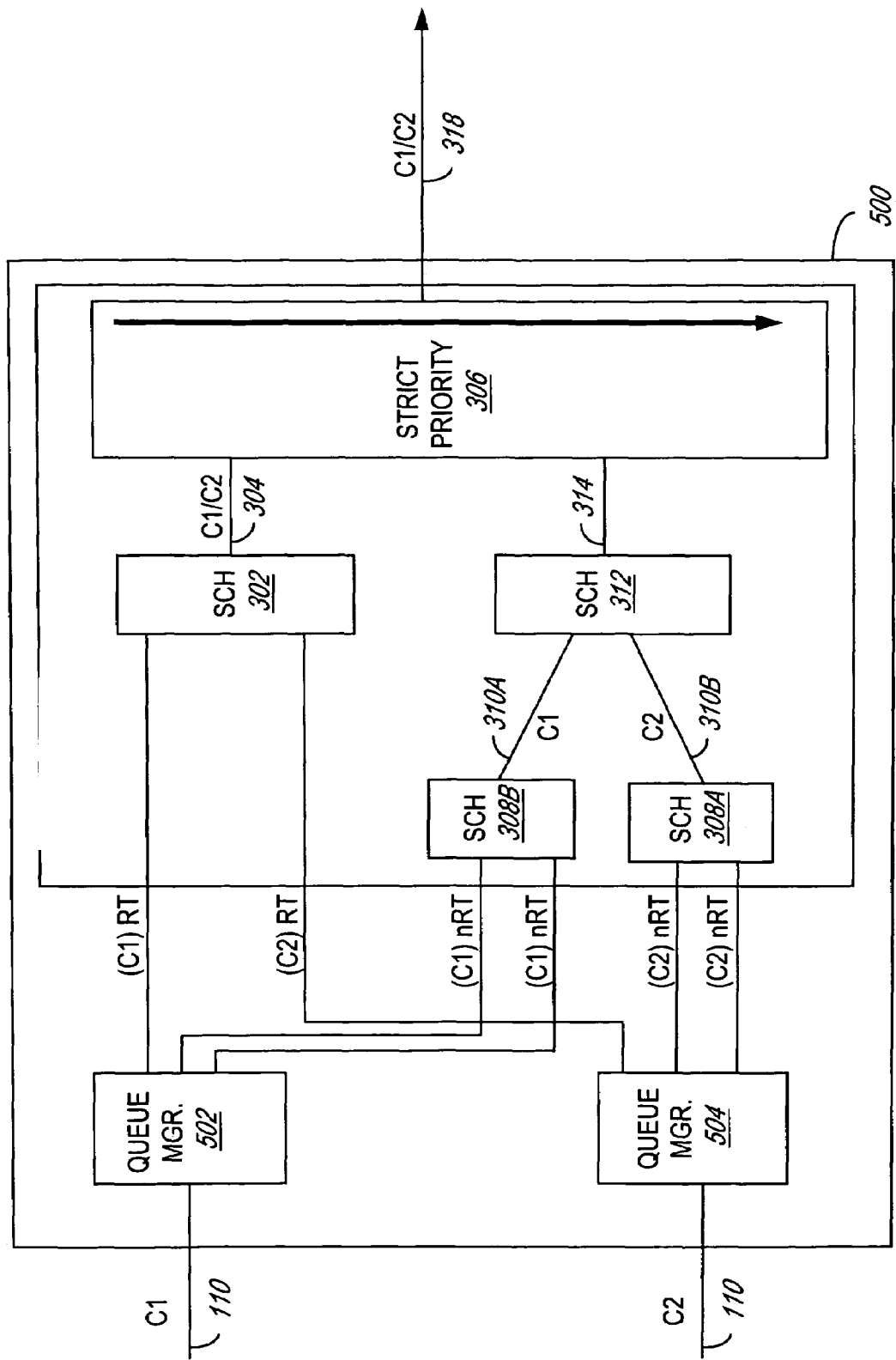
FIG. 5 is a block diagram of processing elements of the access node of FIG. 1 implementing the scheduling arrangement of FIG. 3.

Now referring to FIG. 5, as an illustrative example, the scheduling arrangement of FIG. 3 may be implemented in module 500 in source node 102. Specifically, FIG. 5 shows system 300A located within access node 102, figuratively represented as module 500. Inbound data traffic queue managers 502 and 504 are connected via access links 110 to customer C1 and customer C2, respectively. Module 500 connects scheduler 302 to the output ports of the RT data traffic from queue managers 502 and 504. The scheduled data traffic of scheduler 302 is provided to strict priority scheduler 306. Meanwhile, scheduler 308A receives inbound (C1) nRT data traffic flows from data traffic queue manager 502 and directs the scheduled (C1) nRT data traffic flows to scheduler 312 for further scheduling. Similarly, scheduler 308B receives inbound (C2) nRT data traffic flows 206 from data traffic manager 504 and directs the scheduled nRT data traffic flows to scheduler 312 for further scheduling. The output of scheduler 312 is provided to strict priority scheduler 306. At the outbound end of system 500, the aggregate data traffic being sent out on bandwidth limited line 318 is carried onto network communications link 112 (FIG. 1) for transmission over network cloud 106 (FIG. 1) to the destination node 104 (FIG. 1).

It will be understood by those skilled in the art that the hardware configuration of FIG. 5 is but one of many possible hardware configurations for the system of FIG. 3. In a physical embodiment, module 500 may be deployed in a suitably implemented application specific integrated circuit (ASIC) or field programmable gate array (FPGA). Further, the functionality of module 500 may be provided in two or more modules. For example, one ASIC may be implemented to provide the scheduling aspects and, upon identification of a "winning" scheduled entry, signal a queue manager which is embodied in a different ASIC to actually process transmission of data associated with the winning entry.

It is noted that those skilled in the art will appreciate that various modifications of detail may be made to the present embodiment, all of which would come within the scope of the invention. For example, while a token system has been shown and described to represent the interaction between schedulers for RT and nRT data traffic flows, it will be understood that other analogous traffic management systems may be used to accord highest priority to other metrics for data traffic flows.

As another example, while the system of FIG. 3A described earlier is shown with an additional level of schedulers located before the system, as illustrated in FIG. 3B, these additional levels of schedulers could also be located after the system, such that the last scheduler shown (illustrated as strict priority scheduler 306 in the above example) may itself be scheduled on another scheduler. As well, the relative position in the hierarchy between the high and low priority traffic may be different from that illustrated.

Furthermore, while RT and nRT data traffic flows have been used as an example of data traffic flows having greatly different QoS requirements, it will be appreciated that the teachings of the present invention may be extended to any other categories which are similarly distinguished in QoS requirements.

Also, while limiting the rate of only the RT flows and the aggregate of the nRT flows has been illustrated, additional individual flows, including components of the nRT aggregate, may have their rates limited.

We claim:

1. A method for scheduling a plurality of data traffic flows in a communication network to generate a bandwidth limited aggregate data traffic flow, comprising:
    (i) scheduling data traffic flows of a first category of data traffic with a first scheduler, a data traffic flow of said first category having a first bandwidth capacity associated therewith and at least one data traffic flow of a second category of data traffic associated therewith, said at least one data traffic flow of said second category being scheduled with a second scheduler;
    (ii) for said data traffic flow of said first category, determining whether any portion of said first bandwidth capacity associated therewith is unused and sending a message to said second scheduler indicative of availability of said unused portion; and
    (iii) scheduling said at least one data traffic flow of said second category with said second scheduler using said unused portion as indicated by said message and combining output from said first scheduler and said second scheduler to thereby generate said bandwidth limited aggregate data flow.

2. The method of claim 1, further comprising:
    (iv) associating said second category of data traffic with a second bandwidth capacity for scheduling said at least one data traffic flow of said second category of data traffic, said second bandwidth capacity providing bandwidth for said at least one data traffic flow of said second category of data traffic in addition to any said unused portion of said first bandwidth capacity.

3. The method of claim 2, wherein said first and second categories of data traffic are associated with a user and said first and second bandwidth capacities together comprise a total bandwidth capacity for the user.

4. The method of claim 3, further comprising:
    (v) aggregating said data traffic flows of in said first category of data traffic into a first aggregate data traffic flow;
    (vi) aggregating said at least one data traffic flow of said second category of data traffic into a second aggregate data traffic flow; and
    (vii) directing said first and second aggregate data traffic flows along an allocated network communication path, said network communication path having a bandwidth capacity sufficient to accommodate said total bandwidth capacity for the user.

5. The method of claim 4, wherein said first category of data traffic comprises real time (RT) data traffic, and said second category of data traffic comprises non-real time (nRT) data traffic.

6. The method of claim 1, further comprising:
    (iv) aggregating said data traffic flows of said first category of data traffic into a first aggregate data traffic flow;
    (v) aggregating said at least one data traffic flow of said second category of data traffic into a second aggregate data traffic flow; and
    (vi) directing said first and second aggregate data traffic flows along an allocated network communication path, said network communication path having a bandwidth capacity sufficient to accommodate said first bandwidth capacity.

7. The method of claim 6, wherein said first category of data traffic comprises real time (RT) data traffic, and said second category of data traffic comprises non-real time (nRT) data traffic.

8. A system for scheduling a plurality of data traffic flows in a communication network to generate a bandwidth limited aggregate data traffic flow, comprising:
    a first scheduler for scheduling data traffic flows of a first category of data traffic, a data traffic flow of said first category having a first bandwidth capacity associated therewith and at least one data traffic flow of a second category of data traffic associated therewith;
    a second scheduler for scheduling said at least one data traffic flow of said second category;
    for said data traffic flow of said first category, means for determining whether any portion of said first bandwidth capacity associated therewith is unused and for sending a message to said second scheduler indicative of availability of said unused portion, wherein said second scheduler schedules said at least one data traffic flow of said second category using said unused portion as indicated by said message; and, means for combining output from said first scheduler and said second scheduler to thereby generate said bandwidth limited aggregate data flow.

9. The system of claim 8, wherein said second category of data traffic is associated with a second bandwidth capacity, said second bandwidth capacity providing bandwidth for said at least one data traffic flow of said second category of data traffic in addition to any said unused portion of said first bandwidth capacity.

10. The system of claim 8, wherein said first and second categories of data traffic flows are associated with a user and said first and second bandwidth capacities together comprise a total bandwidth capacity for the user.

11. The system of claim 10, wherein said data traffic flows of said first category of data traffic is aggregated into a first aggregate data traffic flow and said at least one data traffic flow of said second category of data traffic is aggregated into a second aggregate data traffic flow.

12. The system of claim 11, wherein said first and second aggregate data traffic flows are directed along an allocated network communication path, said network communication path having a bandwidth capacity sufficient to accommodate said total bandwidth capacity for the user.

13. The system of claim 12, wherein said first category of data traffic comprises real time (RT) data traffic, and said second category of data traffic comprises non-real time (nRT) data traffic.

14. The system of claim 8, wherein said data traffic flows of said first category of data traffic is aggregated into a first aggregate data traffic flow and said at least one data traffic flow of said second category of data traffic is aggregated into a second aggregate data traffic flow.

15. The system of claim 14, wherein said first and second aggregate data traffic flows are directed along an allocated network communication path, said network communication path having a bandwidth capacity sufficient to accommodate said first bandwidth capacity.

16. The system of claim 15, wherein said first category of data traffic comprises real time (RT) data traffic, and said second category of data traffic comprises non-real time (nRT) data traffic.

* * * * *

UNITED STATES PATENT AND TRADEMARK OFFICE
CERTIFICATE OF CORRECTION

PATENT NO. : 7,289,514 B2
APPLICATION NO. : 10/304770
DATED : October 30, 2007
INVENTOR(S) : Robotham et al.

It is certified that error appears in the above-identified patent and that said Letters Patent is hereby corrected as shown below:

Claim 4, column 10, line 20: Delete the word "in" after the word "of".

Signed and Sealed this

Eighteenth Day of March, 2008

JON W. DUDAS
*Director of the United States Patent and Trademark Office*